March 4, 1924.

A. G. RONNING ET AL

COMBINATION HARVESTER

Original Filed March 2, 1914    5 Sheets-Sheet 1

1,485,532

March 4, 1924.

A. G. RONNING ET AL 1,485,532

COMBINATION HARVESTER

Original Filed March 2, 1914    5 Sheets-Sheet 3

Fig. 3.

Witnesses
Leonard N Jacobson

Inventors
Andrean G. Ronning
Adolph Ronning

March 4, 1924. 1,485,532
A. G. RONNING ET AL
COMBINATION HARVESTER
Original Filed March 2, 1914   5 Sheets-Sheet 5

Patented Mar. 4, 1924.

1,485,532

UNITED STATES PATENT OFFICE.

ANDREAN G. RONNING AND ADOLPH RONNING, OF BOYD, MINNESOTA.

COMBINATION HARVESTER.

Application filed March 2, 1914, Serial No. 822,008. Renewed August 27, 1919. Serial No. 320,305.

*To all whom it may concern:*

Be it known that we, ANDREAN G. RONNING, a citizen of the United States, residing at Boyd, in the county of Lac qui Parle and State of Minnesota, and ADOLPH RONNING, a citizen of the United States, residing at Boyd, in the county of Lac qui Parle and in the State of Minnesota, have invented a new, useful and Improved Combination Harvester, of which the following is a specification.

Our invention has for its object to provide a simple, compact and highly efficient combination harvester having various interchangeable usable attachments adapting the machine to do various kinds of work. For instance, by using the harvester in its most compact form and with the binding attachment attached, the harvester may be used as a corn binder. By replacing the binding attachment with an ensilage cutter and elevator, the machine may be used as an ensilage harvester, to cut the stalks off the field, chop them into suitable lengths for ensilage, and elevate said ensilage into the box of the wagon drawn alongside of the machine. By the use of another attachment the corn ears may be snapped and separated from the stalks and dropped into bushel piles in the field, while the stalks are chopped into suitable lengths for ensilage. By drawing out the outer gathering frame and attached platform which is made to telescope into the main frame, and by attaching to the first named ensilage cutter, a suitable sickle bar, sickle, and reel, the machine may be used to cut alfalfa and like forage, chop the same into small particles and elevate the same into the box of a wagon which is drawn alongside of the machine. By removing the ensilage cutter, the machine may be used as a header. By removing the elevator as well as the ensilage cutter and applying again the above named binding attachment, and a butter apron, and by having the platform reel, and sickle bar applied in the manner just noted, the machine may be used as a binder which is especially adapted to the harvesting of wheat, oats, and the like. By the addition of a second binding attachment which is designed to operate independently of or in conjunction with the said first named binding head attachment and by the addition of a shocker attachment the machine may be used as a combination harvester and shocker, which will tie the received stalks or grain, either in loose form or in bundle form, into a larger bundle or shock, and discharge the same on the ground in such a way as to employ the weight of the shock itself to do the discharging.

In the accompanying drawings, which illustrate the invention, like characters indicate like parts throughout the several views.

Referring to the drawings.

The general construction of the machine, and of its various attachments will now be described.

The main frame 1 of the machine, is carried by, and nearly balanced on the bull-wheels 2 and 3, and is connected to the said wheels by means which provide for the vertical adjustment of said main frame. Bull-wheel 2, is journaled on a short axle 4, which, at its ends, has small spur gears 5, that work vertically in guide brackets 6, which are secured to the main frame 1, and which are provided with rack teeth 7 with which the said gears are engaged. Near one of said spur gears, axle 4 is provided with a worm gear 8 that is engaged by a worm 9 carried by the inner end of a crank shaft 10. This crank shaft 10, at its outer end, is journaled in a suitable bearing 11 which is secured to frame 1, and at its front end said crank shaft is journaled in suitable bearings that are hung on axle 4 embracing gear 8 in such a way as to secure the proper relation between said gear 8 and said gear 9. Bullwheel 3 is journaled and secured to main frame 1 in approximately the same manner as bull wheel 2 as already described, and reference numerals prime from 4 to 11 indicate similar and corresponding parts.

Reference numerals 2″, 4″, 6″ and 8″ indicate the different parts and the relative position of the different parts of the outer gathering frame when it is drawn together in position to cut corn.

Means have now been described, whereby the main frame 1 may be bodily adjusted vertically.

Figure 3:
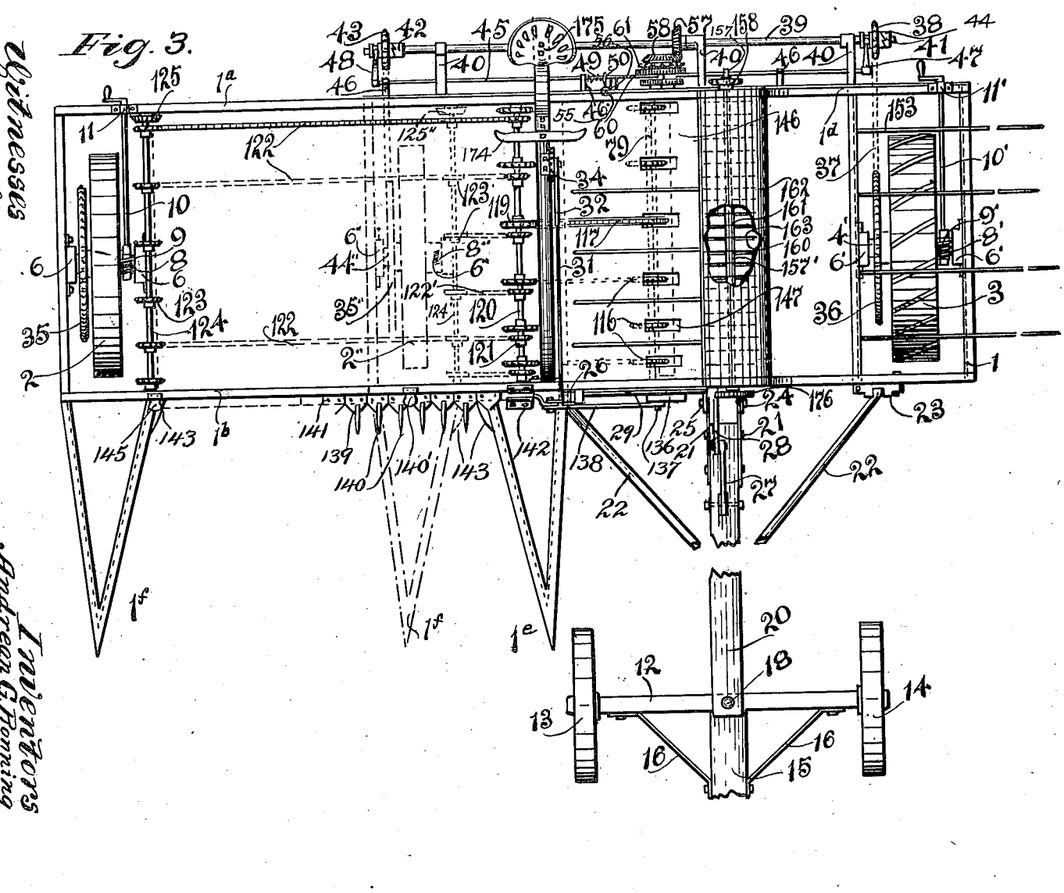
Fig. 3 is a plan view of the machine, with the outer gathering frame and attached platform drawn out as shown in heavy lines, and with said outer gathering frame shown in dotted lines when drawn together or telescoped with the main frame, as adapted to the harvesting of corn, with an ensilage cutter applied thereto, with some parts broken away.

The machine is provided with a front truck, which, as shown, is made up of a front axle 12, front wheels 13 and 14, a pole 15, and brace rods 16, as indicated best in Fig. 3. Truck wheels 13 and 14 travel between the rear wheels 2 and 3, in such a way that front wheel 14 is almost aligned with bull wheel 3, and front wheel 13 is aligned almost with the central portion of the main frame, or in other words, travels almost midway between the rear wheels. The axle 12 and the front truck are pivotally attached at 17 to a bearing support 18 which is attached to the front end of the reach beam 20. This reach beam 20 is connected, at its rear end, to the front of the main frame with freedom for vertical pivotal adjustments, and, as shown, this is accomplished by providing the said reach beam with rearwardly projecting metallic straps 21, and brace rods 22, the rear ends of which are pivotally connected to the said main frame, respectively at 23, 24, 25 and 26. Link 27 connects the intermediate portion of the so called reach beam 20, to the forwardly projecting arm 28, of a shaft 29, which is journaled at each end in suitable bearings secured to main frame and carries at one end the forwardly projecting arm 28, as already described, and which carries at its other end an upwardly projecting arm 30, which is pivotally attached to the front end of a guide rod 31. Guide rod 31 is pivotally connected at its rear end to a lever 32. Lever 32 is provided with the usual latch piece 33, that is engageable with the notches of the latch segment or quadrant 34, to secure the lever in any set adjustment. Lever quadrant 34 is secured to a seat support 165 which will be described later. By oscillatory movements of the lever 28, the front portion of the main frame, and the rear portion of the reach beam 21 may be raised and lowered with a sort of toggle action, thus affording a means by which to tilt the machine.

Figures 4, 12:
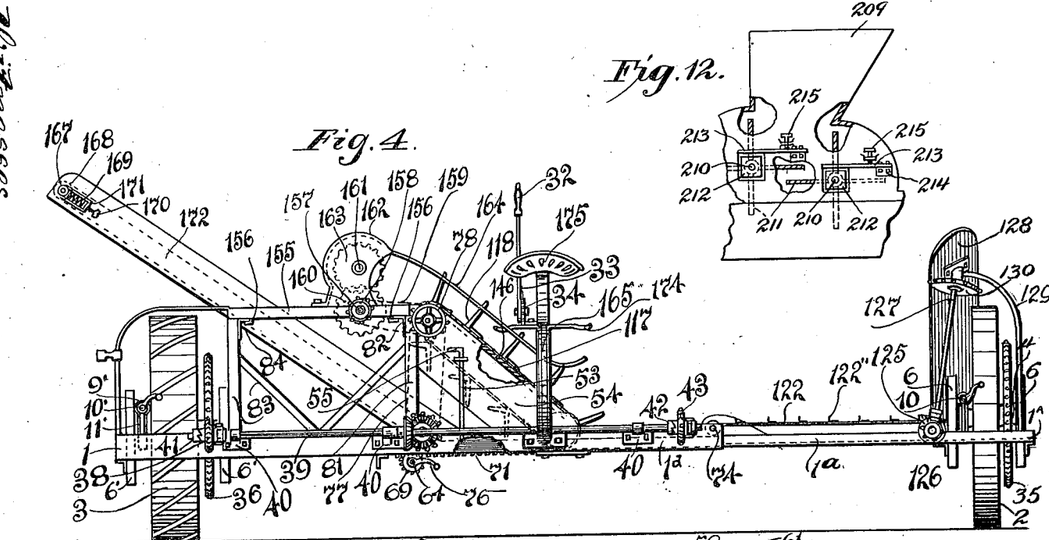
Fig. 4 is a rear view of the machine, with ensilage cutter and elevator applied thereto with some parts broken away.
Fig. 12 is a detail in vertical section or front view of the so called automatic buncher, as shown in Fig. 8, some parts broken away.

Bull wheel 2 carries a large sprocket 35, and bull wheel 3 carries a large sprocket 36. Sprocket 36 carries an endless chain 37 which runs, in its rearward loop, over sprocket 38 which is loosely journaled on shaft 39. Shaft 39 is journaled in suitable bearings 40, which are secured to main frame 1, and carries at one end a rigidly secured hub 41, as well as said sprocket 38, and at its other end, said shaft carries a rigidly secured hub 42 and a loosely journaled sprocket 43, which is best illustrated in Fig. 3 and Fig. 4. Sprocket 38 and hub 41 have projecting slide catches on their inner sides that mesh with each other in such a way as to form what is known as a "jump and catch clutch." Sprocket 43 and hub 42 are constructed in similar manner. When the outer gathering frame is drawn together in position to harvest corn, the machine is so constructed that sprocket 35 will be aligned with sprocket 43, as indicated by dotted lines in Fig. 3, where the numeral 35″ indicates the position of sprocket 35, and where numeral 44″ indicates an endless drive chain which runs over said sprocket 35″, in its forward loop, and over sprocket 43 in its rearward loop. Thus when the platform is telescoped with the main frame we have a machine with two drive wheels which are able to transmit power to a common shaft.

Shaft 45 is journaled, near its ends and near its center, in suitable bearings 46 and 46′, which are secured to main frame 1. At one end said shaft 45 carries a rearwardly projecting strap of spring steel 47, which is loosely journaled in a groove that is cut around the hub of sprocket 38; at its other end shaft 45 carries a strap of spring steel 48, which is loosely journaled, with its rear end, in a groove that is cut around the hub of sprocket 43. Shaft 45 near its center carries a coil spring 49, and a rigidly secured hub 50, in such a way that coil spring 49 presses with one end against hub 50 and at its other end against bearing support 46', thus holding sprockets 38 and 43 with a spring tension against their respective hubs 41 and 42. Rod 53 is journaled at its ends in suitable bearings which are secured to the main frame at its lower end and to elevator sideboard 54 at its upper end. The top end of rod 53 is bent to form a lever handle 55, and the lower end is bent to form a lever spring 56, which projects rearwardly and nearly aligned with hub 50. Thus by turning lever 55 back and forth, lever 56 will press against coil spring 49 and hub 50 in such a way as to slide shaft 45, with its attached springs 47 and 48 and sprockets 38 and 43, back and forth. In this way the machine is put in and out of gear. Furthermore, such a mechanism as already described, will allow one of said sprockets to stand still while the other is turning, thus permitting the machine to turn easily while it is in gear.

Shaft 39 carries, near its center, a beveled gear 57, which meshes with beveled gear 58, which is secured to the rear end of a transverse counter shaft 59, which is journaled in suitable bearings, near its ends, to the front and rear portion of main frame 1. See Fig. 3, and Fig. 5. Shaft 59 carries at its rear end, spur gear 60, which is secured to sprocket 61, which in turn is secured to the said bevel gear 58. Spur gear 62 is also secured to shaft 59 but is smaller than spur gear 60 and is spaced apart from said gear 60 sufficiently to allow a spur gear which is equal to the thickness of gear 60 to easily clear between said spur gear 60 and said spur gear 62. Spur gear 62 meshes with spur gear 63, which is loosely journaled on suitable bearings which are secured to main frame 1, a little under shaft 39, and a little to the right of shaft 59, as illustrated only in Fig. 5 and Fig. 6.

Figure 5:
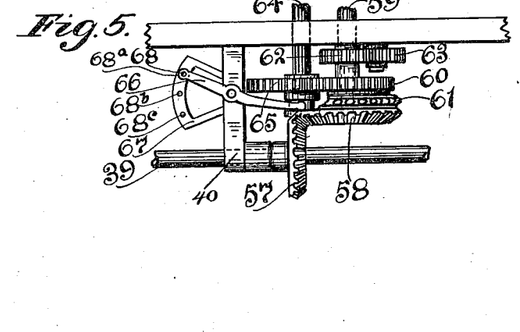
Fig. 5 is a detail showing especially the gearing mechanism by which the platform is telescoped with the main frame.

Shaft 64 runs parallel to shaft 59, and a little to the left of said shaft 59 as illustrated in Fig. 4 and Fig. 5, and is journaled, near its ends, in suitable bearings which are secured to main frame 1 in such a manner as to run underneath said main frame. Spur gear 65 is loosely journaled on a square portion of the rear end of shaft 64, and is designed to mesh with spur gear 60 when at the rear end of shaft 64, and to mesh with spur gear 63 when brought forward on its bearing shaft 64 close to main frame 1. But as gear 63 is aligned with gear 62 and as gear 62 and gear 60 are spaced apart, gear 65 may be brought midway between above named positions, thus breaking connections with both gear 60, and gear 63.

Figure 2:
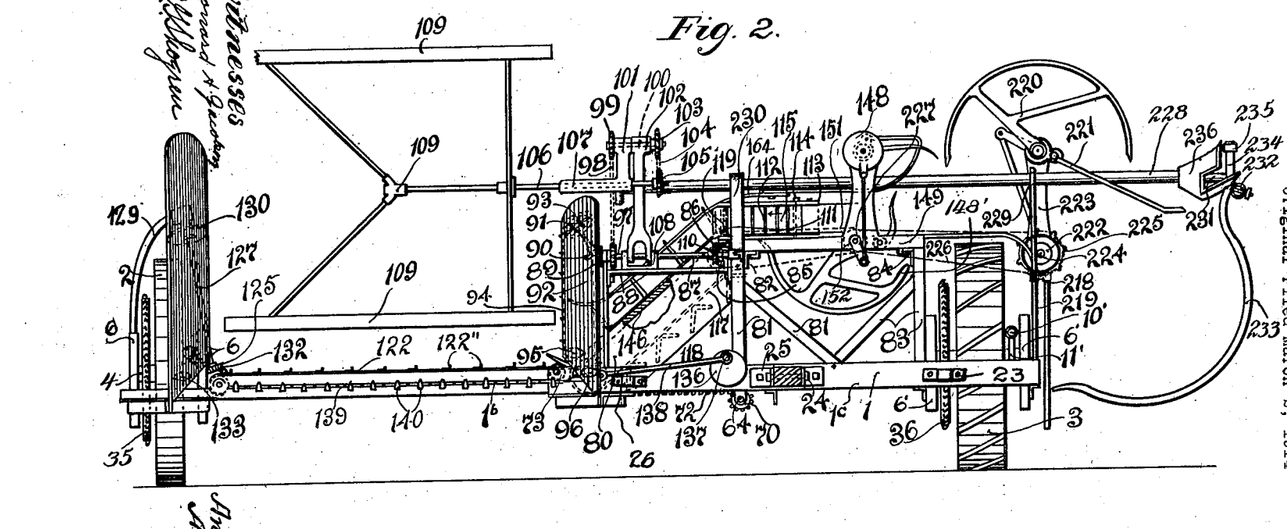
Fig. 2 is a front view of the machine, with the platform drawn out, and with the reel, sickle, sickle-bar, butter-apron, binder attachments and shocker attachment applied thereto, with some parts broken away.
Figure 6:
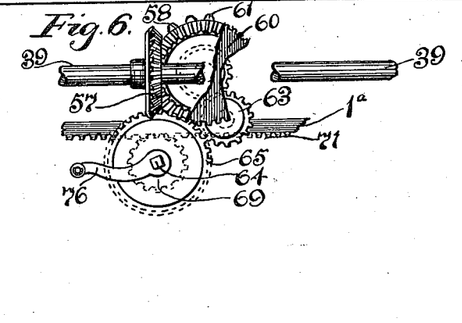
Fig. 6 is a detail in vertical section of Fig. 5.

Lever 66 is pivoted at the center of the segment 67 which is rigidly secured on the bearing support 40. As illustrated in Fig. 5, the right end of lever 66 is loosely journaled in a groove which is cut around the hub of spur gear 65, the other end of said lever 66 is provided with a tooth or peg 68, that is engageable with the notches or cut-outs 68$^a$, 68$^b$ and 68$^c$, of the latch segment 67, to secure the lever in any of the above named set adjustments. Thus by raising the left end of lever 66 and pulling it back into notch 68$^b$, gear 65 will be thrown out of gear with gear wheel 60, and by raising the said end of lever 66 again and pulling it back into notch 68$^c$, gear 65 will be thrown in gear with gear 63, causing shaft 64 to rotate in the same direction as shaft 59. Spur gears 69 and 70, as shown in Fig. 2, Fig. 4, and Fig. 6, are secured to shaft 64 on the inner side of said shaft's bearing supports. Spur gear 69 meshes with the rack teeth 71 of angle iron 1$^a$, as shown in Fig. 6, and Fig. 4, and spur gear 70 meshes with rack teeth 72 of a square tube 1$^b$, as shown only in Fig. 2. Angle iron 1$^a$ and square tube 1$^b$ form part of main frame 1, but more especially the slidable part of main frame 1 which carries the already named platform and outer gathering frame, said platform consisting preferably of a piece of sheet metal of suitable length which is secured to the under side of said angle iron 1$^a$ with its rear side, and to the under side of said square tube 1$^b$, with its front side. Said angle iron 1$^a$ and square tube 1$^b$ ride with their inner ends on spur gears 69 and 70 as already described. Near the inner edge of said platform are two short rollers 73 and 74. Roller 73 is journaled in suitable bearings which are secured to the inner side of the inner end of angle iron 1$^c$, in such a manner as to ride on the top side of square tube 1$^b$, and roller 74 is journaled in suitable bearings which are secured to the inner side of the inner end on angle iron 1$^b$, in such a manner as to ride on top of the outer and upwardly extending flange of angle iron 1$^a$. Thus by rotating shaft 64 back and forth, angle iron 1$^a$ and square tube 1$^b$ will ride back and forth on spur gears 69 and 70 in such a manner as to telescope the platform with the rest of the main frame and bring the outer gathering frame close to the inner gathering frame or vice versa. Now the turning of said shaft 64 may be done by hand, by turning crank 76 which is secured to said shaft 64, as indicated in Fig. 4 and Fig. 6. But if this may be difficult to do at times, means have already been described whereby the said desired purpose may be accomplished by traction power. Thus, when lever 66 is in a position as illustrated in Fig. 5, and the machine is in gear, the outer gathering frame will be drawn out as the machine is pulled forward; or if the left hand end of said lever 66 is placed in notch 68°, said shaft 64 will turn in an opposite direction, as the machine is pulled forward, consequently it will telescope the platform with the rest of the main frame and slowly draw the outer gathering frame close to the inner gathering frame in position to harvest corn and the like. And as there are only a sufficient number of said rack teeth to enable the said platform and outer gathering frame to partake of the said desired movements there will be no danger of breaking the machine by pulling said platform too far. Means have now been described by which the machine may be drawn out into a form and position to cut small grain, and by which its gathering frames may be drawn together into proper place when used to harvest corn and the like.

Sprocket 61 carries an endless sprocket chain 77, which runs in its upward loop over sprocket 78, which is secured to the rear end of a shaft 79. Shaft 79 is journaled, near its ends, in suitable bearings which are secured to the upper ends of elevator sideboards 54 and 80. Elevator sideboard 54 is secured to angle iron 1$^d$ of main frame 1, near the inner edge of said platform. Similarly elevator board 80 is secured, with its lower end, to angle iron 1$^c$ of the main frame 1. The other ends of said elevator boards 54 and 80 incline upwardly and inwardly, with their inner ends secured to a frame support 81, which is secured to angle irons 1$^c$ and 1$^d$ of main frame 1, in any well known and convenient manner. Frame support 81 may be of any convenient height and be braced and secured in any well known manner. At its top, said frame 81 carries an angle iron 82, which runs parallel to shafts 59, 64 and 79, and is secured to said frame 81, by bolts or otherwise, as best illustrated in Fig. 2 and Fig. 4. Support 83 is secured to main frame 1 in approximately the same manner as support 81, but the top flange of its corresponding angle iron 84 turns in opposite direction to the similar portion of angle iron 82 consequently the top flanges of said angle irons 82 and 84 turn towards each other, as illustrated in Fig. 2 and Fig. 4, thus forming a convenient sliding space and support for the various binder head and ensilage cutter attachments, which will be described later.

Figures 7, 8, 9, 10, 11:
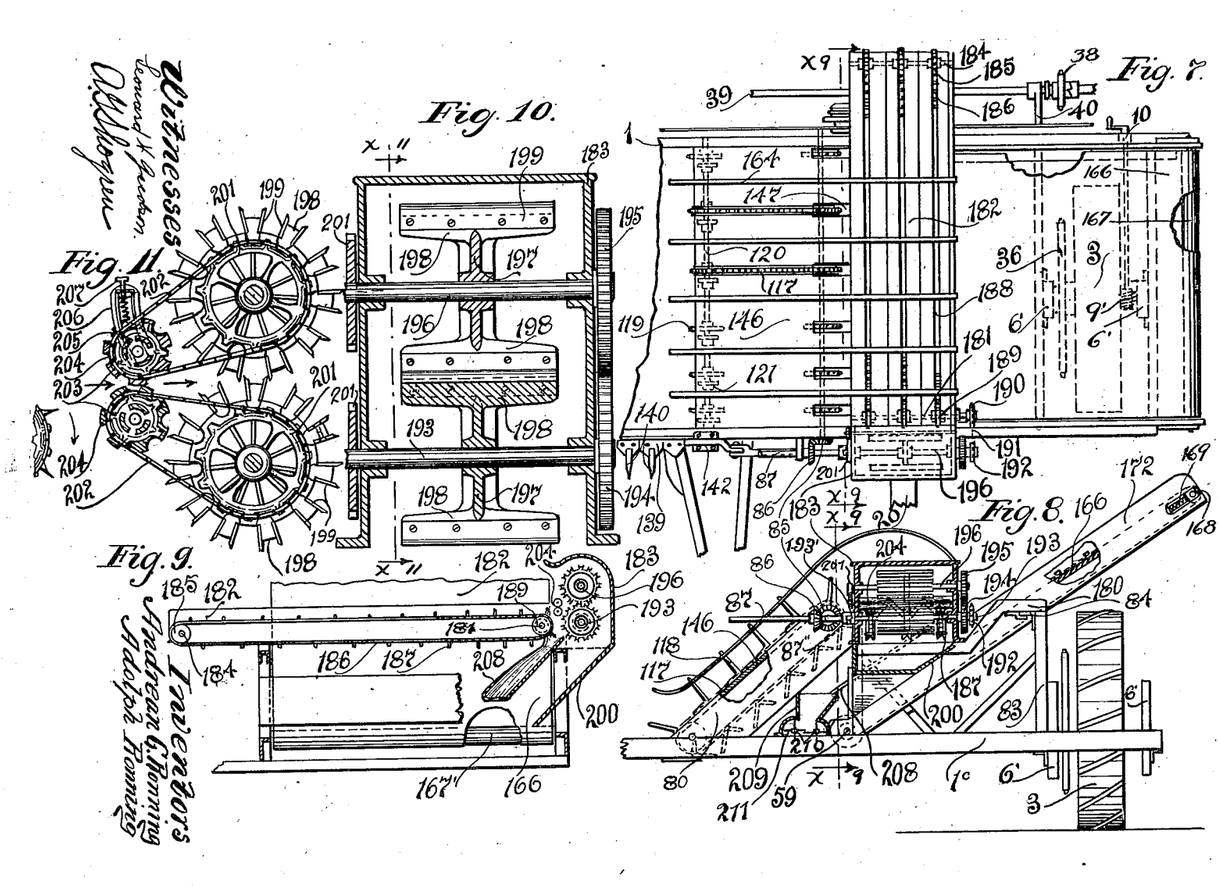
Fig. 7 is a fragmentary plan view of the machine, exhibiting the so called combined ensilage cutter and snapper attachment as applied to the machine.
Fig. 8 is a fragmentary front view showing how said combined ensilage cutter and snapper is applied to the machine and of how the so called automatic buncher is applied to the machine, some parts broken away.
Fig. 9 is a sectional side elevation view taken approximately on line $x^9$ $x^9$ in Fig. 7 and $x^9$ $x^9$ in Fig. 8.
Fig. 10 is a fragmentary detail sectional view of the ensilage cutter head as exhibited in Fig. 8.
Fig. 11 is a detail in vertical section taken approximately on line $x^{11}$ $x^{11}$ in Fig. 10.

Shaft 79 besides carrying sprocket 78, as already described, carries also a beveled gear 85 which meshes with beveled gear 86, which is secured to the inner end of a transverse counter shaft 87, which is shown only in Fig. 2, Fig. 7 and Fig. 8. The right end of shaft 87 is journaled in suitable bearings which are secured to elevator board 80 and frame support 81, and the left hand end of said shaft 87 is journaled in suitable bearings which are secured to a frame support 88, which in turn is secured to board 80, frame support 81 and to angle iron 1$^c$ of the main frame 1 as illustrated in Fig. 2. A. its left end shaft 87 carries a bevel gear 89 which meshes with a bevel gear 90, which is secured to the lower end of shaft 91. The lower end of shaft 91 is journaled in suitable bearings which are secured to support 88, and the upper end of shaft 91 is journaled in suitable bearings which are secured to the upper end of a forwardly inclined, and outwardly and downwardly tilted gathering board 92. Said gathering board 92 is secured at its upper and rear end, to frame support 88, and its front and lower end to the front end of the said inner gathering frame angle irons 1$^e$, which are secured to angle irons 1$^c$ and 1$^d$ of the main frame 1. Shaft 91 carries a sprocket 93 over which runs an endless gathering chain 94, which carries fingers of well known construction and which runs in its forward and downward loop over idlers 95 and 96. Said idlers 95 and 96 are journaled in suitable bearings which are secured, by well known means to the lower end of said gathering board 92.

Shaft 87 carries a sprocket 97 over which runs a sprocket chain 98, which runs in its upward loop over a sprocket 99, which is secured to a shaft 100, which is journaled in suitable bearings in the supports 101 and 102 and which carries on its right end, a sprocket 103, over which runs a sprocket chain 104, which runs in its forward loop over sprocket 105, which is secured to the shaft 106, which runs through a laterally projecting sleeve support 107, which is secured to the forwardly projecting arm support 101 as illustrated only in Fig. 2. The lower end of arm support 102 is loosely journaled in suitable bearings 108 which are secured to frame support 88, by bolts or otherwise. Shaft 106 carries the reel 109. Means for adjusting said reel are of well known construction, and need not here be described as we do not ask Letters Patent covering any peculiar kind of reel mechanism, as most any reel of well known design may be applied. All we desire to do is to show a way of applying power to the reel shaft of one possible design, its manner of mounting and how said reel mechanism may be detached.

Bevel gear 85 also meshes with bevel gear 110 which is carried on the lower end of shaft 111, which runs at right angles to shaft 79, and shaft 87, and is journaled at its ends, in suitable bearings which are secured to frame support 81. Butter boards 112 and 113 run parallel with the main frame and are pivotally journaled near the said ends of shaft 111, with freedom for pivotal adjustments, to swing back and forth with their other ends, and said other ends secure the bearings wherein are journaled the shaft ends of an idler roller 114. Shaft 111, between the bearings of said butter boards, carries a roller over which runs an endless apron or belt 115, which runs in its right loop as indicated by arrow in Fig. 2, over idler roller 114. Other fixtures of said butter mechanism are of well known construction.

Shaft 79 carries a number of sprockets 116, over which run a number of endless packer sprocket chains 117, which carry a number of pivoted or hinged packer fingers 118, which are of well known construction, and are illustrated in Fig. 2 and Fig. 4. Elevator packer chains 117, run in their lower loops over sprockets 119, which are secured to a shaft 120, which is journaled, at its ends, in suitable bearings which are secured, by bolts or otherwise, to angle irons 1$^c$ and 1$^d$ of the main frame. Shaft 120 also carries a number of sprockets 121, over which run the platform finger feed chains 122, which run in their outer loops over sprockets 123, which are secured to shaft 124, which is journaled, as its ends, in suitable bearings that are secured, by bolts or otherwise, to angle iron 1$^a$ and square tube 1$^b$ of the main frame 1. Sprocket chains 122 carry a number of links that have fingers 122'' secured to them. Numbers prime from 122 to 124 indicate the relative length of sprocket chains 122 and the position of sprockets 123 and shaft 124 when the outer gathering frame is drawn into position to cut corn, as illustrated in Fig. 3, Shaft 124 carries at its rear end, miter gear 125, which meshes with miter gear 126, which is carried by the lower end of an upwardly and forwardly inclined shaft 127. Shaft 127 is journaled, at its lower end, in suitable bearings, which are secured, by bolts or otherwise, to angle iron 1$^a$ of main frame 1. At its upper end shaft 127 is journaled in suitable bearings which are secured to the rear end of gathering board 128, and to the brace support 129, which is secured, at its lower end, to angle iron 1$^f$ of the main frame 1. Gathering board 128 bevels or slants inwardly and inclines forwardly with its front end in such a manner as to form an acute angle with the forwardly projecting part of gathering frame angle irons 1$^f$ to which it is secured. A shoe cap 129' is secured to angle irons 1$^f$ and to the lower part of the said gathering board 128. Shaft 127 carries a sprocket 130, near its top end, over which runs the endless gathering chain 131, which runs in its lower and forwardly inclined loop over idlers 132 and 133, which are journaled in suitable bearings 134 and 135, which are secured to the under side of said gathering board 128. Gathering chain 131 carries gathering fingers, a well known construction.

Said chain 131 and the gathering chain 94 which run over sprocket 93 and idlers 95 and 96, are used only for cutting corn and the like, when the said gathering frames are drawn together.

The front inner edges of the said gathering boards or plates 92 and 128, diverge so as to guide the standing stalks into the channel left between them.

Shaft 59 carries at its front end a pitman wheel 136, which is of well known construction, with a crank pin 137 which is secured, between the center and circumference, to the front side of the said wheel 136. Pitman rod 138 is, at one end, suitably journaled to said crank pin 137, at the other end it is suitably connected to a sickle 139, which runs back and forth through the sickle bar 141 and guards 140 and under guide brackets 140', 142 and 145 which are secured by bolts or otherwise to a sickle bar, which, in turn, is secured, by bolts or otherwise, to the square tube 1$^b$ of the main frame 1. Said sickle bar, with attached sickle guards and detachable sickle, etc., are of well known construction, but are used in our machine only when the outer gathering frame is drawn out in position to harvest wheat, oats, and the like. When it is desired to adapt the machine to harvest corn and the like, said sickle bar is preferably removed entirely, as it forms no part of the mechanism necessary when the gathering frames are drawn together in position to harvest corn, except guide brackets 142 and 145, which remain permanently secured to the machine. Thus when the said sickle 139 and sickle bar 141 are detached, and the gathering frames are drawn together in position to harvest corn, a short sickle is substituted for the relatively long sickle 139. No extra sickle bar is needed when the said gathering frames are drawn together, as the thin inwardly inclined cutting blades 143, which are secured to the inner side of the inwardly inclined parts of angle irons 1$^f$ and 1$^e$, form the guard plates against which the said short sickle shears. Thus sickle head bracket 142 and sickle guide bracket 145 remain stationary with their respective gathering frames and are used as the guide brackets for the respective ends of both the said short and long sickles. Pitman rod 138 may be pivotally connected to either of the said sickles.

Elevator bottom 146 is preferably a thin piece of sheet metal, which is secured to the top sides of elevator boards 54 and 80, and with its top edge to the top of elevator frame 81, and has slots 147 cut in it to allow sprocket 116, and elevator packer sprocket chains 117 to pass through said elevator bottom 146. Cut outs 147 are so cut as to allow the packer fingers 118 to pass through them with their rearwardly projecting slide supports at the same time. In other words, when packer chains 117 carry their packer fingers 118 over their sprockets 116, the slide supports of the said hinged packer fingers, being so constructed as to slide on the outside of their respective sprocket chains, are carried on said platform sheet 146 until the outwardly and upwardly projecting fingers of said finger packers 118 are carried far enough over their respective sprockets to be parallel with the frame supports 81, when suddenly the said brace slides of said packer fingers 118 drop through the openings 147 which are cut in the said sheet 146, thus allowing the upwardly projecting fingers of said packer fingers 118 to drop back and slide out of the stalks or grain which they carry and proceed with their respective sprocket chains through the comparatively small openings 147. This sort of packer chain and packer fingers are now used in corn harvesters and need no further description. We intend to show how this principle of the combined elevator and conveyor packer mechanism may be applied in harvesting small grain, and how it may be employed in a combination harvester that will serve equally well as a wheat and oats harvester, or as a corn harvester.

Figure 1:
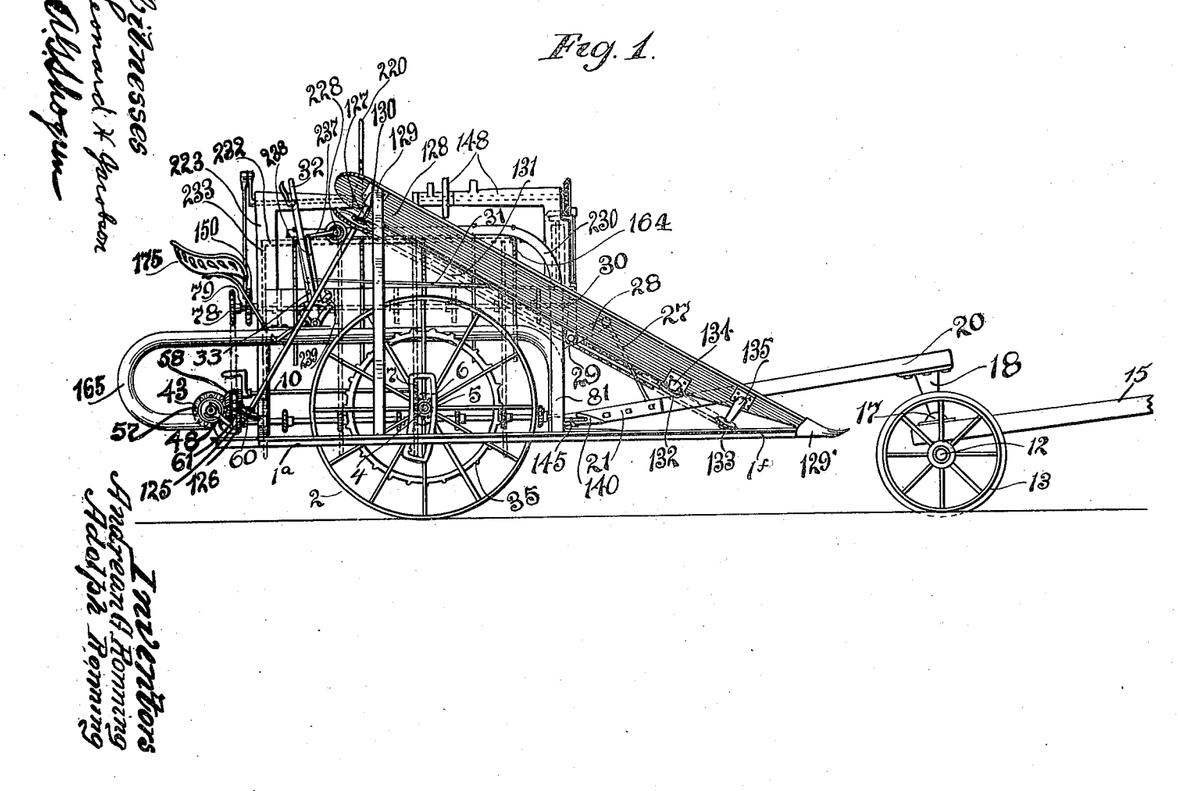
Fig. 1 is a side elevation of the improved machine, with the binder attachments and shocker attachment applied thereto.

A binder head 148, of well known and approved construction is secured by bolts or otherwise, to a supplemental frame 149, which is preferably made of angle irons in a rectangular form, with a piece of sheet metal, with the proper cut outs for the binder needle 148′ and tripper, etc., secured to the top of said angle iron frame. Said binder frame 149 is mounted on the top of frame supports 81 and 83 in such a manner as to be conveniently drawn back and forth on the top of angle irons 82 and 84, by means of a lever or otherwise. Sprocket 150, shown in Fig. 1, is secured to the rear end of said shaft 79, over which runs a sprocket chain 151, which runs in its outer loop over sprocket 152, which is secured to the rear end of an ordinary binder head drive shaft, with well known means provided for the mounting and adjusting thereof.

A piece of sheet metal or rods 153 as shown in Fig. 3 are secured to the top of frame support 83, extend over the top of bullwheel 3 and are secured to the top of frame support 219, curve downward and are secured at the lower ends to the main frame 1.

Said binder head and butter mechanism as already described, may be removed and an ensilage cutter attachment substituted therefor, when it is desired to chop the received stalks or grass, etc., into small particles for ensilage purposes, instead of binding it into bundles. Said ensilage cutter receives from the same gathering and feeding mechanism as the above named binder head mechanism does, and is mounted on a supplemental frame 155, and is secured by bolts or otherwise to said supplemental frame 155 as shown in Fig. 3, and Fig. 4. Said ensilage cutter frame 155 is preferably made of angle irons in the same maner as the frame of the said binder head attachment already described and is mounted on the angle irons 82 and 84 and frame supports 81 and 83 and is secured to said angle irons 82 and 84 by hooks 156 or otherwise.

Shaft 157 runs parallel to shaft 79 and is journaled at its ends, in suitable bearings which are secured to the ensilage cutter frame 155. Shaft 157 cerries a sprocket 158, which carries a sprocket chain 159, which runs on its inward loop over sprocket 150. Said shaft 157, between its said bearings, is preferably square and carries a number of cut out disk cutters 160 which fit closely to shaft 157 and are spaced apart by short thimbles or sleeves 157′ or otherwise. Shaft 161 is immediately above and parallel to shaft 157, and is journaled in suitable bearings which are secured to the ends of an ensilage cutter cover 162, which covers the top and outer side of the ensilage cutter and is secured to the said ensilage cutter frame 155. Shaft 161 carries a number of disk cutters 163, which are constructed and spaced apart in the same manner as the said disk cutters 160. Both of the said series of disk cutters 160 and 163 may be smooth at their circumferences or they may have cut outs at their circumferences. Both are sharpened and have their respective shafts 157 and 161 properly spaced apart, and the upper disk cutters shear against the lower disk cutters. See Fig. 3 and Fig. 4. The front ends of shafts 157 and 161 carry spur gears 176, that mesh with each other causing the said disk cutters to rotate in opposite directions. Spring fingers 164 are secured to a seat support 165, by bolts or otherwise, at their lower ends and to the top of the said ensilage cutter cover 162 with their upper ends, and serve to guide and direct the stalks into said ensilage cutter.

Shaft 59 carries roller 167′, over which runs an endless belt 166, which runs on its upwardly and outwardly inclined loop over an idler roller 167, which is journalled at its ends, in bearings 168, which are yieldingly pressed upwardly and outwardly by coil springs 169, which are adjusted at their inner and lower ends, by means of set screw devices 170, which are secured to the yoke bearings 171, which are secured to the top and outer ends of elevator boards 172 which are secured, near their centers to angle iron 84 and to the main frame with their inner and lower ends.

Lever quadrant 34 as already described, is secured to the seat support 165 which is preferably made of a yoke tube, which is secured at its front end, to frame support 88 and to the main frame 1. The rear, underslung, forwardly projecting part of seat support 165, is secured to angle iron 1$^d$ of the main frame, near the rear end of shaft 120 as illustrated in Fig. 1, Fig. 3 and Fig. 4.

Feet supports 174 and seat 175 are secured, by bolts or otherwise, to the top rear portion of said seat support 165.

Spring fingers 164 are secured, at their lower ends, to seat support 165, and run parallel, between and above sprocket chains 117, gently curve as they rise until their top portions are parallel to supplemental frame 149, and may be secured at their outer ends, to crane shocker support 230.

A new condition arises however, when the ears are to be snapped from the stalks and separated from the ensilage, namely, that the snapping rollers employed for such a purpose, work best when they receive the stalks butt ends first. Consequently an ensilage cutter that will cut the stalks butt ends first as they are received from the said snapping rollers will best serve our purpose in this connection.

A detachable frame 180 is suitably mounted on the frame supports 81 and 83 of the machine. A shaft 181 is journaled, at its ends, in suitable bearings, which are secured to the sides of an ensilage cutter platform 182, which carries on its front end, an ensilage cutter-head frame 183, and which is secured to said supplemental frame 180. Shaft 184 is journaled, at its ends, in suitable bearings, which are secured to the rear end of said platform 182. Shaft 184 carries sprockets 185 over which run the endless sprocket feed chains 186, which carry suitable feed fingers 187, and which ride in grooves 188, which are made in the bottom of the platform 182. See Fig. 7, Fig. 8 and Fig. 9. Said feed chains run in their forward loops, over sprockets 109, which are secured to shaft 181. Shaft 181 carries, on its outer end, a sprocket 190, over which runs a sprocket chain 191, which runs in its forward loop over sprocket 192, which is secured to the outer end of shaft 193, which is journaled at its ends in suitable bearings which are secured to the ends of cutter-head frame 183. At its other end, shaft 193 carries a jump-and-catch clutch hub 193', which is of well known and approved construction and whose clutch-teeth mesh with the clutch-teeth of a similar jump-and-catch clutch hub 87' which is secured to the end of shaft 87. Shaft 193 is aligned with shaft 87, and is rotated by shaft 87 by means of the already described jump-and-catch mechanism. Shaft 193 carries, at its inner end, near said clutch hub 193', a sprocket 201. At its other end, close to sprocket 192, said shaft 193 carries a spur gear 194 that meshes with spur gear 195, which is secured to the outer end of shaft 196, which is mounted immediately above and parallel to shaft 193, and is journaled, at its ends, in suitable bearings which are secured to the ends of said cutter head frame 183.

Between said bearings, said shafts 193 and 196 carry two cooperating cutting cylinders. Said cutting cylinders consist of wheels 197 with side projecting flanges or fingers 198, which are carried at the circumferences of said wheels. Cutter blades 199 are sharpened or edged on one side and secured, by screws or otherwise, to the sides of said fingers, as best illustrated in Fig. 10 and Fig. 11. Said fingers 198 are parallel to each other and to shafts 193 and 196 and are spaced apart in such a way that the distance between the outer shearing edges of their respective cutter knives are nearly equal, so that when the two cutting cylinders rotate the cutter blades of the one shear against the cutter blades of the other, as illustrated in Fig. 11, and Fig. 9. Said cutter blades 199 do not reach the sides of the cutter-head frame 183, but leave an open space at each end for the cut particles of stalk to drop out of the said cutter cylinders as illustrated in Fig. 8, and Fig. 10. Such an arrangement is deemed necessary because most of the cut stalks will pass between said finger cutting-blades into the centers of the said cutter cylinders, consequently clogging would result unless the cut particles could freely escape at the ends. But as it is now arranged, the cut particles drop from the ends of said cutting cylinders, and are directed by chute board 200 onto the endless elevator belt 166, which is already described.

Shafts 193 and 196 carry on their inner ends sprockets 201 over which run sprocket chains 202, which run in their rearward loops over sprockets 203, which are secured to the inner ends of snapping rollers 204, which are of well known and approved construction, which are journalled, at their ends, in suitable bearings, which are secured to the said ensilage cutter head 183. Said suitable bearings for the said upper snapping rollers 204, consist, preferably, of bearing blocks 205, which slide up and down in yoke sockets 206. Said bearing blocks 205 are yieldingly pressed downwardly by coil springs, which in turn are pressed downwardly by set screws 207 which are secured to the upper ends of said yokes 206.

208 indicates a chute board which directs the snapped ears as they drop from said snapping roller mechanism, into a hopper 209, which is secured by means of bolts or otherwise onto the main frame 1 between shafts 59 and 120. Shafts 210 are journaled in suitable bearings which are secured to the ends of said hopper. Between said bearings, said shafts 210 carry a number of fans 211 which serve as the bottom and part of the sides of said hopper 209, as illustrated in Fig. 8 and Fig. 12. Shafts 210 carry at their front ends, square hubs 212, which are yieldingly pressed downwardly by straps of spring steel 213, which are secured at one of their ends by brackets 214, which are secured to the front end of said hopper 209. The tension of said springs 213 is adjusted by means of a set screw device 215 which is of any well known and approved construction.

We have now described our preferred form of ensilage cutter in a machine of this character. It is evident however, that any well known make of ensilage cutter head may be mounted on the supplemental frame 180 and used in connection with the snapping rollers as just described. This however, would make it necessary to mount an engine on the machine and operate the ensilage cutter by engine power. But as there is no power wasted on feeding rollers in the ensilage cutter as we have just described, and as there is no power wasted in jamming the stalks against a flat cutting bar as is the case in the ordinary ensilage cutters, and as three or four feet of stalks can be cut for every turn of the cylinders and as the required speed of the ensilage cutter is consequently reduced, it will therefore become more practical to employ an ensilage cutter of this type in a harvester which is run and operated exclusively by horse power, and even if this combination harvester be operated exclusively by engine power as a combination harvester-tractor, the ensilage cutter as just described may be used to good advantage in such a machine.

We shall next describe the so called shocker attachment, which is shown only in Fig. 1 and Fig. 2. A relatively large binder head is secured to a supplemental frame 218, which is secured, with freedom for adjustment, to a support 219, which is secured to main frame 1 of the machine. Said binder head is of well known and approved construction, but is larger then the binder head already described, and is preferably mounted up-side-down with the corresponding parts of the said binding attachments rearranged so that the needle 220 and tripper 221 etc., of the latter binding attachment are mounted above their binding mechanism 222 instead of underneath as is the case in the said first binding head attachment. Furthermore yoke casting 223 which forms the framework of the said latter binding head attachment, is mounted on the rear portion of the machine, with two yoke arms projecting forwardly, as best shown in Fig. 1. Binding head wheels 222 are similar to the ordinary binding head wheels which co-operate with, and run the knotter, twine holder, and other such well known tying mechanism, with the exception that the kickers or arms ordinarily employed to kick out the bundles, may as well be dispensed with. Said wheels 222 are secured to the front end of a shaft 224 which runs through the lower yoke sleeve of the yoke casting 223, and carries on its rear end a sprocket 225, which has well known and approved means for running the several mechanisms of the said second binding mechanism. Sprocket 225 carries a sprocket chain 226 which runs in its inward loop over sprocket 227 which is secured to sprocket 152.

Said second binding head attachment receives sheaves from the said first binding head attachment, and is designed to tie the received sheaves or bundles into a larger bundle or shock.

Shocker sleeve 228 is carried by sleeve supports or cranes 229 and 230. Sleeve supports 229 and 230 are secured to frame supports 81 and 219. The downwardly projecting arms of said sleeve supports are aligned and parallel to their said respective frame supports, while the upper and rearwardly projecting arms of the said sleeve supports run parallel to angle irons 82 and 84 as illustrated in Fig. 1 and Fig. 2. Said shocker sleeve 228 may be secured to said shocker sleeve cranes 229 and 230, by bolts or otherwise and with freedom for adjustment. Shaft 231 runs through the said shocker sleeve 228 and is journaled in suitable bearings which are secured to said shocker sleeve. A shaft or tube 232 is journaled, near its central portion, in suitable bearings which are secured to the outer end of said shocker shaft 231 in such a way as to have its two arms perpendicular to, or at right angles with said shocker shaft, and in such a way as to permit the proper adjustments of relations between said shaft 231 and said tube 232. A number of downwardly projecting and inwardly curved arms 233 are rigidly secured, by bolts or otherwise, at suitable points, to the said tube 232. See Fig. 1 and Fig. 2. A short finger 234 is secured to tube 232 in such a way as to be perpendicular to tube 232 and in such a way as to permit proper adjustment of its relation to tube 232. A roller 235 is suitably journaled to the outer end of said finger 234. A casting 236 is rigidly secured to the outer end of shocker sleeve 228, and is so constructed as to form a semicircular track support on which the roller 235 travels, when shocker shaft 231 is rocked. Furthermore, the front and forwardly projecting portion of the said semicircular track, drops back towards said shocker sleeve 228 in such a way as to allow finger 234 with its attached roller 235 to close up to said shocker shaft 231 when said finger 234 is swung forwardly, and when the front end of tube 232, with its shocker arms 233, is swung by its attached shocker shaft 231, to the ground.

A lever arm 237 is attached, at one end, to the inner end of the said shocker shaft 231. The other end of said lever arm 237 is pivotally attached to the upper end of a guide rod 238, which is pivotally secured, at its lower end to a foot lever 239. Foot lever 239 is of well known and approved construction being similar to those now employed in swinging the bundle carriers of the ordinary harvesters.

The movement and operation of the machine will then be as follows:—

All the running parts of the machine may be driven from the bull wheel 3, when the platform is drawn out and when the machine is adapted to the harvesting of wheat, oats, and the like, and from both the bull wheels when the platform is telescoped with the main frame and when the machine is adapted to the harvesting of corn and the like, as already described.

When the machine is adapted to the harvesting of corn, the platform is drawn inwardly and telescoped with the main frame by means of the gearing mechanism already described, the regular corn harvesting gathering chains are applied to sprocket 93 and over idlers 95 and 96 and to sprocket 130 and over idlers 132 and 133 as described, platform chains 122, are shortened and drive chain 44 is applied as shown in Fig. 3, and a short sickle is inserted and connected to pitman rod 138. If it be then desired to chop the stalks for ensilage purposes and at the same time separate the ears from the stalks and drop the ears on to the ground in bushel piles, the so-called combination ensilage cutter, snapper and buncher attachment is applied, as well as ensilage elevator 172 as shown in Fig.7, Fig. 8, Fig. 9, Fig. 10, Fig. 11 and Fig. 12.

As the machine is then drawn forward, the standing stalks are directed by gathering chains 94 and 131 rearwardly until they are severed from the ground by the said short sickle mechanism whereupon the severed stalks drop onto short platform chains 122 and are delivered to elevator packer chains 117. Elevator 117 then delivers the stalks sidewise onto elevator platform 182 of the ensilage cutter and snapper. Feed chains 186, which ride in grooves 188 and which run parallel to the path of movement of the machine then direct the received stalks butt ends first into direct engagement with the snapping rollers, which continue to move the stalks forwardly with their butt ends first into direct engagement with ensilage cutter cylinders which are provided with cutting blades 199, and which cut the stalks into small particles by means of the shearing of the said cutter blades as the said cylinders are rotated. But in doing so said snapping rollers snap the ears from their respective stalks. The ears being unable to pass between the said snapping rollers drop through the channel left between the said snapping rollers and shaft 181, onto chute board 208 which directs them into hopper 209. As the ears are accumulated in hopper 209, they will press downwardly on fans 211 as a result of their weight causing them to rotate periodically allowing the ears to drop out in bunches on to the ground. As the corn stalks are cut by means of said cylinder cutters the cut particles drop from said cutting mechanism and are directed by chute 200 on to endless conveyor 166 of the elevator 172. The cut particles of stalk are then carried by elevator belt 166 outwardly and upwardly and dropped into the box of a wagon drawn alongside of the machine.

By drawing out the platform by means of gearing mechanism as shown in Fig. 4, Fig. 5 and Fig. 6, by removing the gathering chains 94 and 131, by applying a sickle bar with attached guards, by substituting the long grain sickle 139 for the short corn stalk sickle, by applying reel mechanism as exhibited in Fig. 2 and by using the last noted ensilage cutter mechanism the machine may be used to cut alfalfa and like forage for ensilage purposes. As the machine is then drawn forward the standing alfalfa will then be severed by means of said sickle mechanism and directed on to platform conveyor chains 122 by means of said reel mechanism. The cut alfalfa is then carried by platform conveyor chains 122 and delivered to elevator packer chains 117 and carried by said elevator packer chains 117 and delivered to the said ensilage cutter mechanism and cut into small particles, in which event the snapping rollers 204 may as well be dispensed with. The cut particles of alfalfa and like forage are then delivered from the machine in the same manner as the cut particles of corn stalks already described.

If it be desired to bind the alfalfa, grain or corn stalks into bundles the said ensilage cutter attachments may be replaced by a binding attachment which is mounted on frame supports 81 and 83 so as to slide back and forth on angle irons 84 and 82. Said binding mechanism receives from said elevator packer chains 117, and consequently may be used when the machine is telescoped and adapted to the harvesting of corn or the like, or when the platform is drawn out as when the machine is adapted to the harvesting of wheat, oats, alfalfa or the like. A butter apron as shown in Fig. 2 is of course used in this connection. Whether the machine is adapted to the harvesting of corn or to the harvesting of grain the elevator finger packer chains 117 deliver and pack the received stalks or grain into the bundle as formed and tied by said binding mechanism.

The bundles are made square and even at their butts by means of said butter mechanism. And the said binding mechanism is driven by means of drive chain 151.

Of course elevator 172 may receive directly from elevator packer chains 117 when said binding mechanism and ensilage cutter attachments are removed, in which case the machine may be used as a header to harvest grain, or as a corn harvester, elevating loose stalks directly into a wagon driven alongside the machine. Or again, if a binding attachment as exhibited in Fig. 2, be slightly raised on its outer side, said elevator 172 may receive from said binding attachment and convey the received bundles from said binding attachment into a wagon driven alongside of the machine.

But if it be desired to shock the corn, alfalfa or grain instead of elevating it into the rack of a wagon as just described, said elevator 172 may as well be removed and a second binder and shocker attachment, as exhibited in Fig. 2 may be substituted therefor. Said second binding attachment then receives from said first binding attachment, and is so designed as to bind the received stalks or bundles into a larger bundle or shock. As the cut stalks pass under spring fingers 177 and are elevated, delivered and packed into bundles by means of finger packer chains 117, and bound and tied into bundles by means of the said first binding attachment, they then pass between shocker shaft 228 and the platform of said first and second binding attachments and are dropped and packed on to the fingers 233 of the shocker attachment. When there are sufficient bundles or stalks accumulated in said shocker attachment to raise tripper 221, said second binding attachment then ties the received stalks into a larger bundle or shock which is then ready to be discharged on to the ground. The driver then releases foot lever 239 whereupon shocker shaft 231 turns, allowing the front end of shocker tube 232 with its attached shocker fingers 233 to drop, and the rear end of said shocker tube 232 with its attached shocker fingers 233 to rise. As the shock lies with its greatest weight on the front shocker fingers 233, said shocker tube 232 with attached shocker fingers 233 drops to the ground automatically allowing the shock to be discharged with its butt end first on to the ground, as the machine is drawn forward. As this is being done, roller 235 rolls forwardly on its semicircular track casting 236. But as soon as shocker tube 232 has swung far enough to be perpendicular to the ground and the shock is in its upright or vertical position, roller 235 drops into the recess provided for such action in casting 236, in such a manner as to release shocker fingers 233 and allow them to swing outwardly. As the said shocker fingers are swung outwardly, the shock is allowed to stand in its upright position, butt ends planted on to the ground and tops bound together to withstand the storms. The driver then by means of said foot-lever 239, swings the said shocker attachment back into position for the next shock. If the tripper and twine of the first binding attachment be removed, the said second binding attachment will tie the received stalks into a large bundle or shock. But if the tripper and twine be removed from the second binding attachment instead of the said first binding head attachment, the said shocker may still be used but the top of the resulting shock will of course not be tied.

We claim:—

1. A harvesting machine having in combination a frame adapted to support grain binding and ensilage cutting devices, a grain platform mounted thereon, cutting means on said platform, an elevating means adjacent said platform to receive the cut material therefrom, and adapted to deliver either to a binding or an ensilage cutting device.

2. A harvester having in combination, a frame adapted to support grain binding and ensilage cutting devices, a grain platform mounted thereon, cutting means on the platform, means for telescoping said platform, elevating means adjacent said platform and receiving the cut material therefrom, and adapted to deliver to either a binding or an ensilage cutting device.

3. A harvester having in combination a frame adapted to support grain binding and ensilage cutting devices, a grain platform mounted thereon, means on said platform for cutting stalks of grain, means on said platform for feeding said stalks butt ends first, means for snapping ears from said stalks, elevating means adjacent said platform and receiving the stalks therefrom and adapted to deliver the same to either a binding or ensilage cutting device.

4. In a harvesting machine having a frame adapted to support a binding or ensilage cutting mechanism, the combination of a driving mechanism, means for connecting said driving mechanism to either the binding or ensilage cutting mechanism, and a feeding means adapted to deliver to either a binding or ensilage cutting mechanism.

5. In a harvester, the combination with cutting means and a flexible platform, said platform comprising relatively fixed and movable sections of gathering boards on the relatively fixed and movable sections of said platform, said gathering boards being movable toward or from each other when said platform is extended or contracted, and stalk conveyers operatively associated with said gathering boards when said platform is contracted.

6. In a corn harvester, the combination with a primary stalk cutter, of means for removing the ears from the stalk, an ensilage cutter, and means for delivering the stalks butt ends first from said primary to said ensilage cutter.

7. In a corn harvester the combination with a primary stalk cutter, of means for removing the ears from the stalk, an ensilage cutter, and means for delivering the stalks butt ends first from said primary to said ensilage cutter, and means for delivering ears from the machine and for maintaining separation thereof from the stalks.

8. In a corn harvester, the combination with a primary stalk cutter, of an ensilage cutter, and means for delivering the stalks butt ends first from the said primary cutter to said ensilage cutter and for removing the ears from the stalks at a point between said primary cutter and ensilage cutter.

ANDREAN G. RONNING.
ADOLPH RONNING.

Witnesses:
LEONARD H. JACOBSON,
A. G. SHOGREN.